(12) United States Patent
Simske

(10) Patent No.: US 9,977,922 B2
(45) Date of Patent: May 22, 2018

(54) MULTI-TIER STORAGE BASED ON DATA ANONYMIZATION

(71) Applicant: Hewlett-Packard Development Company, L.P., Fort Collins, CO (US)

(72) Inventor: Steven J Simske, Ft. Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days. days.

(21) Appl. No.: 14/786,512

(22) PCT Filed: Apr. 25, 2013

(86) PCT No.: PCT/US2013/038162
§ 371 (c)(1),
(2) Date: Oct. 22, 2015

(87) PCT Pub. No.: WO2014/175887
PCT Pub. Date: Oct. 30, 2014

(65) Prior Publication Data
US 2016/0132697 A1    May 12, 2016

(51) Int. Cl.
*G06F 21/62* (2013.01)
*G06F 21/78* (2013.01)

(52) U.S. Cl.
CPC .......... *G06F 21/6254* (2013.01); *G06F 21/78* (2013.01); *G06F 2221/2113* (2013.01)

(58) Field of Classification Search
CPC .. G06F 21/6254; G06F 21/6245; G06F 21/78; G06F 2221/2113
See application file for complete search history.

(56) References Cited

U.S. PATENT DOCUMENTS

| 2005/0246292 | A1  | 11/2005 | Sarcanin |
| 2007/0185737 | A1* | 8/2007  | Friedlander ............ G06Q 50/24 705/3 |
| 2008/0168135 | A1  | 7/2008  | Redlich et al. |
| 2009/0013051 | A1  | 1/2009  | Renschler |
| 2009/0019065 | A1  | 1/2009  | Sapounas |
| 2012/0124099 | A1  | 5/2012  | Stewart |
| 2012/0158678 | A1  | 6/2012  | McGraw |
| 2014/0201847 | A1* | 7/2014  | Ito ........................ G06F 21/60 726/26 |

FOREIGN PATENT DOCUMENTS

| WO | WO-2005091138 A1 | 9/2005 |
| WO | WO-2013031997 A1 | 3/2013 |

OTHER PUBLICATIONS

Yeye et al. NPL 2009 with page numbers—Anonymization of Setvalued Data via Topdown.*

(Continued)

*Primary Examiner* — Tri Tran
(74) *Attorney, Agent, or Firm* — HP Inc. Patent Department

(57) ABSTRACT

Examples disclosed herein relate to a multi-tier storage based on data anonymization. A processor may store data in a first data tier. The processor may anonymize the data according to a first anonymization level and store the anonymized data in a second data tier. The processor may associate a first user with the first data tier and associate a second user with the second data tier.

19 Claims, 5 Drawing Sheets

(56) References Cited

OTHER PUBLICATIONS

He, Y et al, "Anonymization of Setvalued Data via Topdown, Local Generalization", Aug. 24-28, 2009.
International Search Report and Written Opinion of the International Searching Authority, dated Jan. 24, 2014, issued in related PCT Application No. PCT/US2013/038162.
Slagell, A et al, "Flaim—a Multi-level Anonymization framework for Computer and Network Logs", Nov. 10, 2006.
Latanya Sweeney: "Computational Disclosure Control for Medical Microdata: The Datafly System", Dec. 31, 1997 (Dec. 31, 1997), XP055206079.

* cited by examiner

MULTI-TIER STORAGE BASED ON DATA ANONYMIZATION

BACKGROUND

Data may be anonymized to provide anonymity to a person and/or group associated with the data. Data anonymization techniques may be used to obfuscate a portion of the data such that it is more difficult to associate the data with a particular individual or group. Data anonymization may be desirable, for example, where data includes personal information, such as information related to health care, banking records, or other data considered to be private.

BRIEF DESCRIPTION OF THE DRAWINGS

The drawings describe example embodiments. The following detailed description references the drawings, wherein.

DETAILED DESCRIPTION

In one implementation, a multi-tier storage system associates a different tier of data with different user groups, and each tier has a different statistical data anonymization level. The different user groups may be associated with different tiers for data access such that they receive data with different anonymization levels. The anonymization may be based, for example, on a trustworthiness of the user group and/or the particular data use of the user group.

An anonymization scheme may be determined that anonymizes the data with the appropriate anonymization confidence level. An anonymization scheme related to which data to obfuscate and the manner of obfuscation may be determined based on a comparison of privacy and effectiveness. For example, a processor may analyze the likelihood of associating the data record with an individual to the effectiveness of the data as anonymized in providing information used for a correct outcome in the user's data analysis. In one implementation, a processor continually updates the database tiers, anonymization levels, and/or user group assignments to maintain desired anonymization and effectiveness levels.

Anonymizing a portion of the data and storing the data separately with different anonymization schemes to be accessed by different user groups may allow the same data schema to be used between different user groups with different levels of access. In addition, an anonymization scheme with multiple data tiers of access may provide greater security than storing all data as anonymized where some groups are provided information used to reverse the anonymization in response to a user query.

Figure 1:
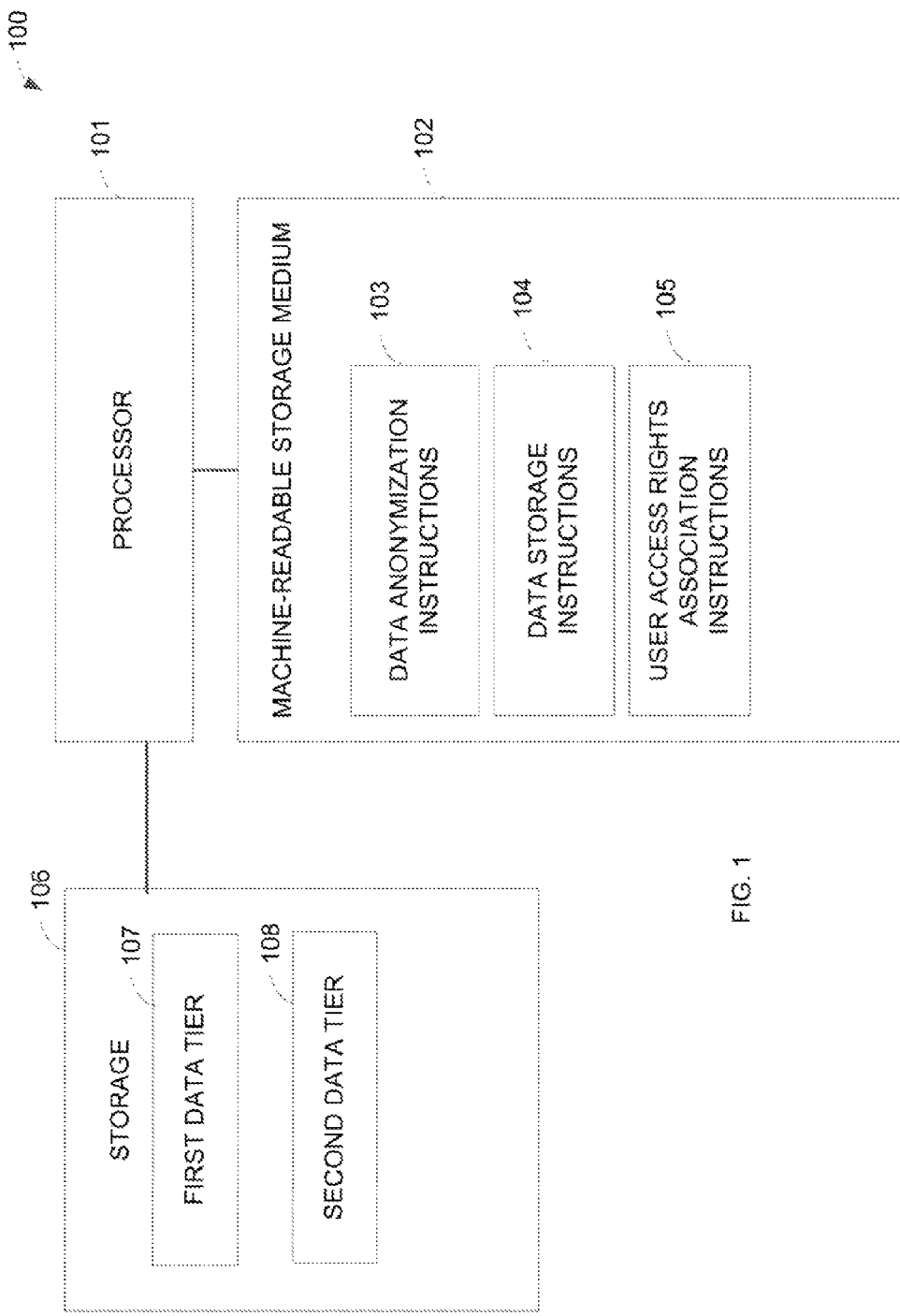
FIG. 1 is a block diagram illustrating one example of a multi-tier storage system based on anonymization.

FIG. 1 is a block diagram illustrating one example of a multi-tier storage system based on anonymization. For example, the computing system 100 may store items in a storage system with multiple data tiers where different user groups access different tiers. The different tiers have different statistical anonymization levels such that some levels store data in a manner with a lower likelihood of being able to reverse the anonymization scheme to associate the data with an individual and/or group. As an example, the tiers may be divided into a public, hybrid, and private cloud. The data available from the public cloud may have a greater anonymization confidence level than data available in the private cloud, and the hybrid cloud may store data with an anonymization confidence level intermediate to the confidence levels of the anonymization of the public and private cloud. The computing system 100 may include a processor 101, a machine-readable storage medium 102, and a storage 106. The computing system 100 may be included within a single or multiple apparatuses.

The storage 106 may be any suitable storage for storing data accessible by the processor 101. In some implementations, the storage 106 and machine-readable storage medium 102 may be included within the same device. The storage 106 may include a first data tier 107 and a second data tier 108. The storage 106 may include any number of data tiers. The data tiers 107 and 108 may be stored in the same device or in different devices. For example, the data tiers 107 may each be stored in a separate web server. Users may access the different tiers in the storage 106 via a network. The data tiers 107 and 108 may store the same underlying data with different anonymization levels such that a different user set is associated with each of the data tiers 107 and 108, allowing the different sets of users to access data with different anonymization levels.

The processor 101 may be a central processing unit (CPU), a semiconductor-based microprocessor, or any other device suitable for retrieval and execution of instructions. As an alternative or in addition to fetching, decoding, and executing instructions, the processor 101 may include one or more integrated circuits ((ICs) or other electronic circuits that comprise a plurality of electronic components for performing the functionality described below. The functionality described below may be performed by multiple processors.

The processor 101 may communicate with the machine-readable storage medium 102. The machine-readable storage medium 102 may be any suitable machine readable medium, such as an electronic, magnetic, optical, or other physical storage device that stores executable instructions or other data (e.g., a hard disk drive, random access memory, flash memory, etc.). The machine-readable storage medium 102 may be, for example, a computer readable non-transitory medium. The machine-readable storage medium 102 may include data anonymization instructions 103, data storage instructions 104, and user access rights association instructions 105.

The data anonymization instructions 103 may include instructions to anonymize at least a portion of data. The data may be received from a user associated with one of the database tiers or may be received from another storage. The computing system 100 may include a centralized processor for sending data to the different storage tiers. In one implementation, the centralized processor performs the anonymization prior to sending the data to a data tier. In one implementation, the storage 106 includes a hierarchical structure where the different tiers communicate with one another. When a user associated with a tier attempts to store data, the data tier associated with the user may transmit the information to the other tiers for storage. The receiving data tier may be associated with a processor to anonymize the data prior to storage.

The data anonymization instructions 103 may include instructions for determining an anonymization scheme, such as which portion of the data to anonymize and/or an anonymization method for the data. For example, a higher statistical confidence in the anonymization may be achieved where more fields are anonymized, fields more highly correlated to the individual are anonymized, and/or where the anonymization method is more difficult to reverse. The data anonymization instructions 103 may include instructions for anonymizing the data based on which tier the data is to be stored in. The anonymization may be performed based on information about the use of data for a particular group to access the anonymized data and a confidence level of the anonymization. For example, a preferred anonymization level may be provided that indicates a statistical chance of reversing the anonymization to identify an individual or group associated with the data record despite the anonymization. Information about the priority of different data fields to the user group associated with the particular tier may also be provided. For example, there may be some fields that are essential for performing the user function, some that are desirable, and others that are irrelevant. The data anonymization instructions 103 may include instructions for determining a manner for anonymizing the data to the preferred level in a manner that preserves more of the higher priority fields to the user group. For example, data fields and data field labels may be selected for anonymization, and an anonymization token or nonce may be selected. An anonymization scheme may be determined for each type of record that may be stored in a data tier.

The data storage instructions 104 may include instructions to store received data in the storage 106. The data storage instructions 104 may include instructions for storing received data in the associated data tier with the anonymization level of the data associated with the tier. For example, data may be received and stored in the first data tier 107. The data may be anonymized and stored in the second data tier 108. The same data may be stored in both locations with different data obfuscated and/or obfuscated in a different manner. The anonymization level may later be updated for a particular tier, for example, by elaborating data in a particular data field such that it is no longer obfuscated as part of the anonymization scheme. The update may take place in the particular tier without making a change to the same data stored in other tiers.

The user access rights association instructions 105 may include instructions for assigning a user and/or user group to a storage 106 tier. A user may be associated with a tier based on a privacy level to be associated with the user. For example, a first user may be considered a more trusted user. In some cases, the purpose of the data use of the user is considered. For example, the same level of statistical confidence in the anonymization may be achieved by anonymizing different fields, and the user group may be assigned to a tier with fields important to the user of the user group not obfuscated as part of the anonymization.

A user may be associated with a data tier such that user requests for data are retrieved from the associated tier. When the user stores data, a processor associated with the tier may send the data to other data tiers to be stored with the appropriate anonymization level for the other data tiers. In some implementations, data storage is performed through a central processor that sends the data to each of the tiers. In some implementations, the receiving tier sends the information to a tier above and below the tier in the anonymization, and those data tiers then propagate the information to other tiers to be stored with the appropriate anonymization levels and schemes.

Figure 2:
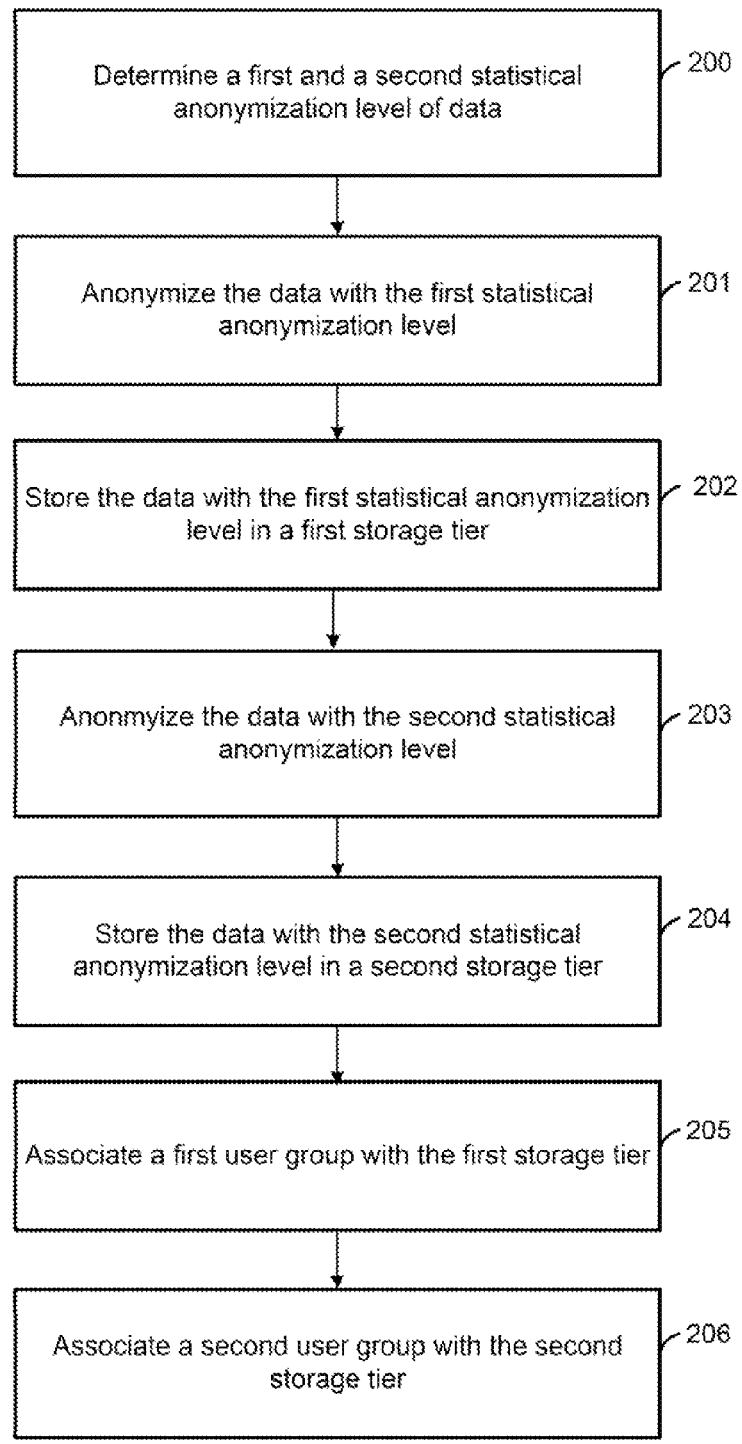
FIG. 2 is a flow chart illustrating one example of a method to create a multi-tier storage based on data anonymization.

FIG. 2 is a flow chart illustrating one example of a method to create a multi-tier storage based on data anonymization. Each tier may be associated with a different user group and may have a different statistical level of anonymization. For example, a first group may be associated with a lower access level and a higher level of anonymization. A higher level of anonymization may be achieved, for example, through anonymizing more data fields and/or anonymizing them with a scheme more difficult to reverse. A second user group may be associated with a higher level of access, such as where the second user group is likely to use more of the data fields and/or is a group of more trusted users. In one implementation, the method is implemented by the computing system 100 of FIG. 1.

Beginning at 200, a processor determines a first and a second statistical anonymization level of data. The levels of anonymization may be determined based on a statistical likelihood of the ability to reverse the anonymization. Reversing the anonymization may involve associating enough of the non-obfuscated data to disambiguate the identity of an individual or group related to the data. In some instances, reversing the anonymization may involve breaking an encryption or other mechanism for obfuscating data. The anonymization may be reversed where the identity of the individual and/or group associated with the data is narrowed to the point of abrogating an acceptable level of privacy. As an example, different fields of data and/or different data field labels may be obfuscated depending on the determined anonymization level. The levels of anonymization may be determined based on access groups to be associated with the anonymization levels. The two anonymization levels may have different statistical confidence levels associated with maintaining the anonymity. In some implementations, the first level of anonymization may involve fully elaborated data and the second level of anonymization may involve the data with some fields obfuscated using an anonymization technique.

Continuing to 201, a processor anonymizes the data with the first statistical anonymization level. The anonymization may be performed in any suitable manner. The anonymization level may be associated with a statistical likelihood of being able to reverse the anonymization. The purpose of the data access by the particular group may be taken into account in determining how to anonymize the data to the particular statistical level, such as which fields to obfuscate. The anonymization scheme may be determined based on the use of the data in addition to a preferred privacy level. The likelihood of being able to associate the data record with an individual or group may be greater where fewer fields are anonymized and/or the anonymization method is more difficult to reverse. The level of anonymization may be greater where certain fields are anonymized as opposed to others. For example, anonymizing a field related to a social security number may provide a greater level of anonymity than anonymizing information related to gender. To further anonymize data, the field labels and/or the number of fields in a record may be anonymized. The anonymization itself may be performed in a manner such that the same data in a field in different records does not share the same token.

The selected fields and/or labels may be anonymized, for example, by replacing data with data encrypted using a nonce such that actual data is not stored. In some cases, nonsense data may be appended to the anonymized data such that the anonymized data does not appear the same where the field data is the same in multiple records. The anonymization may involve, for example, obfuscating data fields, obfuscating names of data fields, matching tokens between different records, number of data fields, and/or any combination thereof.

Moving to 202, a processor stores the data with the first statistical anonymization level in a first storage tier. The first storage tier may be a separate area of a storage or a separate storage apparatus from other tiers in a multi-tier database system. The anonymization may be performed prior to storing the data instead of or in addition to obfuscating the data in response to a user query.

Proceeding to 203, a processor anonymizes the data with the second statistical anonymization level. An anonymization scheme may be determined that balances the desired statistical anonymization level with a usefulness of the data to the particular type of user group. In some cases, the anonymization scheme is different due to different fields that may not be anonymized due to the purpose of the information to a user group accessing the data with the second anonymization level. The processor may determine an anonymization scheme of the desired confidence level that preserves the usefulness of the data.

Moving to 204, a processor, stores the data with the second statistical anonymization level in a second storage tier. The data with the second anonymization scheme may be stored in the second tier such that it may be accessed by a different group than the first storage tier. The second tier may be stored separately from the first tier in a separate apparatus or in a different partition within the apparatus, such as in a different database or different database table.

Proceeding to 205, a processor associates a first user group with the first storage tier. The first user group may send and retrieve data from the first tier. The user group may be associated with the first storage tier based on a desired anonymization confidence level and the data use of the first user group.

Continuing to 206, a processor associates a second user group with the second storage tier. The second user group may send and retrieve data from the second tier. When data is stored from the second tier it may be anonymized for the second tier prior to storage.

The data may be anonymized according the first anonymization level and stored in the first tier to become accessible from the first user group. In some cases, different sets of data are anonymized with different anonymization levels for the same user group. For example, some tables may be fully elaborated for multiple user groups accessing multiple tiers and some tables with more sensitive data may be anonymized for some tiers and anonymized at different statistical levels according to the tier. The anonymization level may differ based on the use of the data. For example, fewer fields may be obfuscated despite leading to a higher statistical likelihood of reversing the anonymization due to an important use for the non-anonymized fields.

In some implementations, data corresponding to an event, person, etc may include different levels of anonymization, such as where some data is stored outside of the tiered anonymization system. For example, some event data may not be anonymized for any user and some data related to the person associated with the event may be anonymized with different levels for storage in different tiers.

In one implementation, the data is stored with multiple anonymization schemes with the same anonymization level. The anonymization level may have the same statistical confidence against reversing the anonymization but where different fields are obfuscated. For example, two fields together may provide greater identifying information, and the first anonymization may obfuscate the first field and the second anonymization may obfuscate the second field based on the use of the data.

In one implementation, additional security is provided in addition to the anonymization. In some cases, encryption may be used as data is transmitted to a user and decrypted on the user's device. Additional information may be used to associate a user with the correct tier and/or authenticate the user. For example, a password or biometric may be analyzed prior to allowing a user to connect to the tier associated with the user login. In some cases, a user may not be provided access to a particular data table or other structure, and a portion of the data in the table may not be anonymized because the data is not used by the particular user group.

In one implementation, the multiple tiers may be divided and anonymized according to a public, private, and hybrid cloud. For example, a private cloud may include fully elaborated data such that the data is easily associated with a user. The user may be a trusted user. For example, the individual to whom data is related may view the data in a fully elaborated form. A public cloud may include information in a highly anonymized format. As an example, a government agency may analyze the data, but the identity of the people associated with the data may be irrelevant to the purpose of the data analysis. A hybrid cloud may be created with an anonymization level between that of the public and private cloud.

A multiple tier database with different anonymization levels may be used in a healthcare setting. A data schema may include non-anonymizable event stamps, such as related to time, event name, and context, anonymizable event stamps, such as patient name, location, medical provider ID, and event data with any level of privacy. The information may include the different anonymization and privacy levels to account for the different access levels provided to different people using the data. For example, a physician's aid may have access to medical data but not to a social security number or other patient identifier, and a physician may have a reduced view of the data to enable a quicker diagnosis without inundation from irrelevant data.

In one implementation, the anonymization levels and storage tiers may be updated. The processor may determine a statistical likelihood of a reversing the anonymization. In some cases, the likelihood may be based on the number of records stored with the anonymization scheme, such as the number of records with the same data in a field with the same anonymization scheme. As more data is stored, the processor may statistically analyze the data in relation to the anonymization scheme to determine a confidence level associated with the anonymization scheme. If the confidence level of providing anonymity is below a threshold, the processor may update the anonymization scheme to ensure it provides anonymity at the level associated with the particular storage tier.

In some implementations, the processor may experimentally determine the effectiveness of the anonymization. For example, the processor may attempt to reverse the anonymization without using the nonce or other information used to anonymize the information. The ability of the processor to reverse the anonymization and/or the number of attempts prior to reversing the anonymization may be used to determine an effectiveness level of the anonymization.

In one implementation, the processor may determine the usefulness of the data as anonymized. For example, some personal data that is anonymized and not provided may potentially hinder the usefulness of the data, such as the gender or age of a patient provided to a medical professional attempting to diagnose the patient. The processor may receive user feedback as to whether a user was able to correctly analyze data with the available non-anonymized data. In some cases, the processor may determine the usefulness of the data based on an analysis of similar outcomes. For example, the processor may determine that the gender or age of a patient is used in X % of medical diagnosis's and determine the usefulness of the anonymized data from the statistics. In some cases, the use of the data may be related to data mining, and the ability of a processor to successfully make connections based on the data mining may be used to determine the usefulness of the data as anonymized.

In one implementation, the processor compares a ratio of anonymization effectiveness to data usefulness to a threshold. If the ratio is below or above the threshold, the processor may automatically update the anonymization scheme. For example, if the usefulness is too low, the processor may anonymization a smaller amount of the data, and if the effectiveness is too low, the processor may anonymize more data fields and/or encrypt the data more strongly.

In some cases, if the processor determines that a set of data may not be anonymized to a sufficient level of confidence to prevent discovery, the set of data may be identified to be used as a biometric. For example, information about the fields may be output to a user. The data set may become a group of data to identify the particular user, and the data set may be used in passwords or other information for providing access to the user.

In one implementation, the user associations and anonymization levels may be updated. For example, a new tier may be added such that a new user group is added to the new anonymization level and/or users from other tiers are associated with the new tier. The new tier may have a greater level of anonymization such that the risk of reversing the anonymization is less than the previous tier from which some of the users were assigned. A split in anonymization may occur where the tier is divided such that the same group is assigned to the tier, but the tier stores different types of data with different anonymization levels. The tiers may be merged, such as where a tier is removed and the users from the removed tier are assigned to another tier. In some cases, a portion of a tier is merged, such as where multiple user groups access fully anonymized or fully elaborated data for a first set of the data, but each user group is assigned to a different anonymization level for a second set of data. The processor may determine whether to add or merge tiers, such as based on anonymization statistics, and may automatically perform the addition or removal of a tier based on the determination. The addition and removal operations may be performed instead of or in addition to altering the way data is anonymized to be displayed in response to a user query.

Figure 3A:
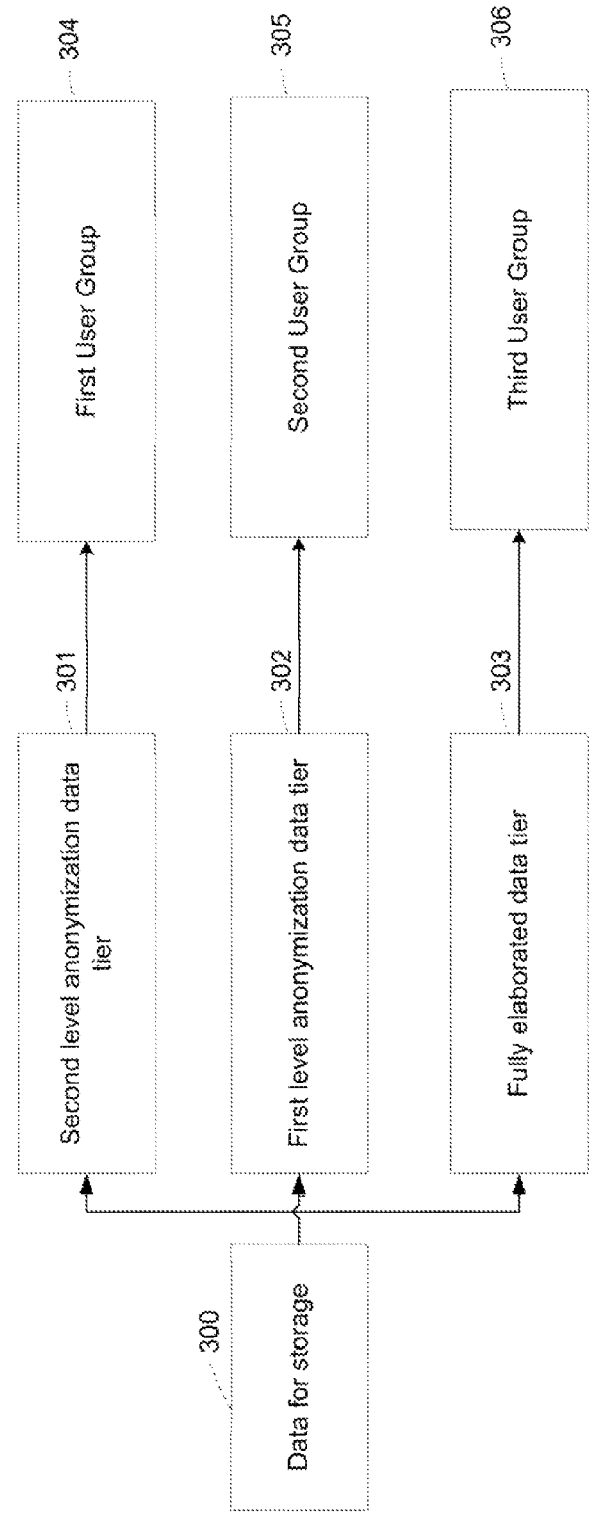
FIG. 3A is a block diagram illustrating one example of a multi-tier storage based on data anonymization.

FIG. 3A is a block diagram illustrating one example of a multi-tier storage based on data anonymization. The multi-tier storage may include three data tiers 301, 302, and 303 with different anonymization levels. For example, data tier 303 stores fully elaborated without anonymization techniques to disassociate a user or group with the data records, data tier 301 stores data with a first anonymization confidence level, and data tier 302 stores data with a second anonymization confidence level greater than the first anonymization confidence level. The data for storage 303 is stored separately in each of the three tiers with the associated anonymization levels. A different user group may be associated with each of the tiers such that the different users receive the same data but with a different amount of anonymization. For example, the third user group 306 is associated with data tier 303, the second user group 305 is associated with data tier 302, and the first user group 304 is associated with the first user group 304. The third user group 306 accesses fully elaborated data such that the users in the group do not receive some obfuscated data. The first user group 304 accesses data with the second level of anonymization confidence. In some cases, users may be switched from one group to another if the status of the user changes and/or the user's use of the data changes.

Figure 3B:
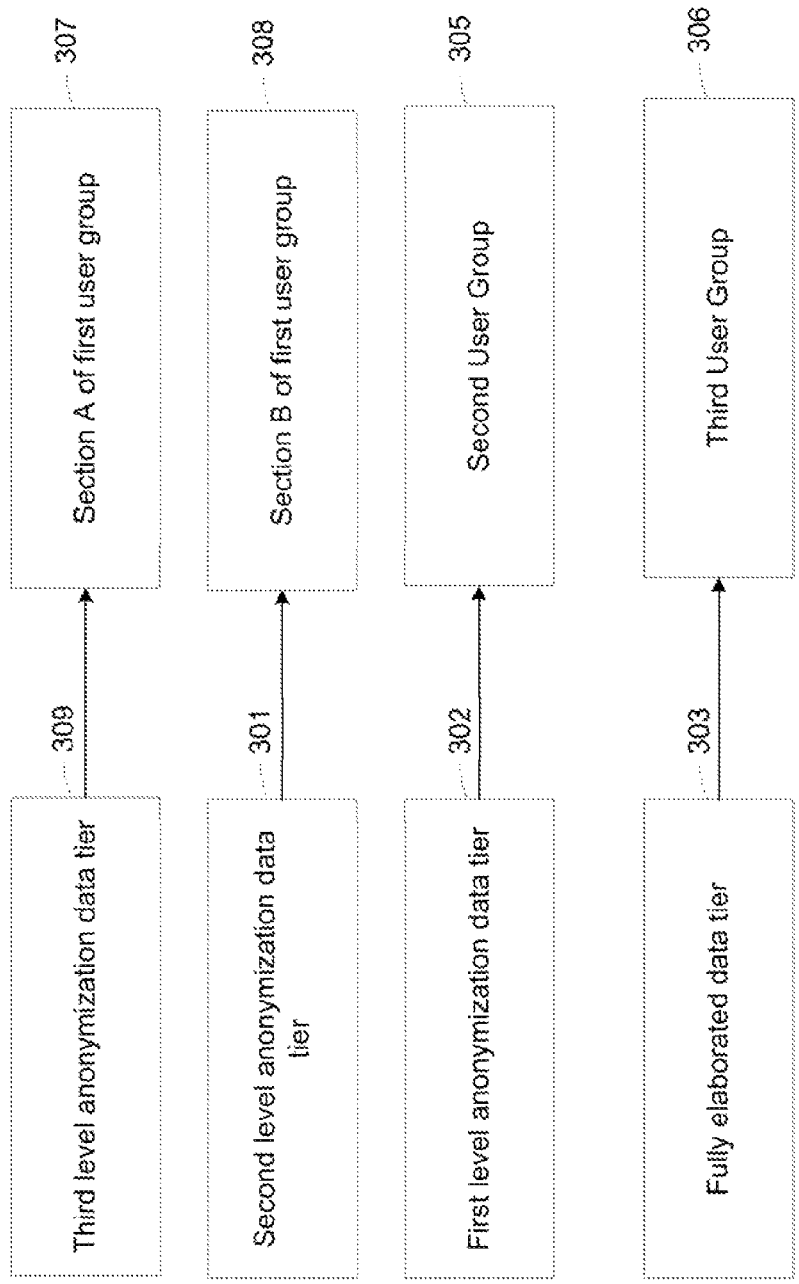
FIG. 3B is a block diagram illustrating one example of updating the data tiers in a multi-tier storage based on adding a new data tier.

FIG. 3B is a block diagram illustrating one example of updating the data tiers in a multi-tier storage based on adding a new data tier. For example, a new data tier with a new anonymization confidence level may be created. The new tier may be associated with the users from other tiers and/or new users to the system. For example, the user group from another tier may be split between the new tier and the old tier. FIG. 3B shows the first user group 304 from FIG. 3A split between two user groups such a portion of the users now access data with one anonymization confidence level and another portion of the users now access data with another anonymization level. The data tier 309 is added with data having a third anonymization confidence level greater than that of the other tiers. Section A of the first user group 307 may be associated with the new data tier 309, and section B of the first user group 308 may be associated with the data tier 307 from FIG. 3A. The new tier may be manually be added. In one implementation, the new tier is added in response to an automated analysis of the anonymization confidence level and/or usefulness of the data as anonymized. The new tier may be added based on a determination that fewer fields are used by a portion of the user group, allowing a greater level of anonymization to be achieved.

Figure 3C:
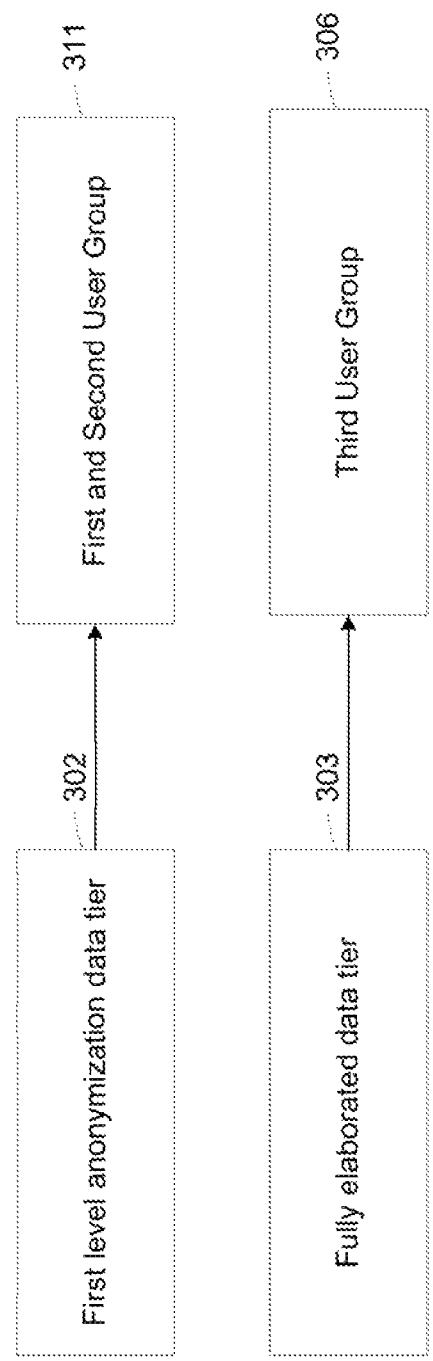
FIG. 3C is a block diagram illustrating one example of updating a multi-tier storage to remove one of the tiers.

FIG. 3C is a block diagram illustrating one example of updating a multi-tier storage to remove one of the tiers. For example, a tier may be removed when a user group is removed or reassigned to a new tier. The change may be made, for example, in response to an analysis of the anonymization levels, such as where an anonymization scheme is determined to be inadequate, a higher level of anonymization is desired, or a lower level of anonymization is desired to provide users with greater access to the data. In some cases, the anonymization level may change over time. For example, archived data may eventually use less anonymization. At that point, the data in one tier where it was anonymized may match that of a tier of fully elaborated data. The tiers may be merged such that the anonymized data is no longer used and user's from the anonymized access data froth the fully elaborated data tier.

As shown in FIG. 3O, the data tier 301 from FIG. 3A with the second level anonymization is removed from the data tier system. The first user group previously assigned to the data tier 301 is reassigned to the data tier 302 such that block 311 shows both the first and second user groups assigned to the data tier 302. Automatically updating the tiers, anonymization confidence levels, and/or anonymization schemes provides a flexible data storage system to adapt to different users, types of data, and data restrictions.

The invention claimed is:
1. An apparatus, comprising:
   a storage, comprising a first tier on a private cloud and a second tier on one of a hybrid cloud and a public cloud; and
   a processor to:
      store data in the first tier;

anonymize at least a portion of the data using an anonymization scheme with a first anonymization confidence level to obfuscate data fields and names of data fields;
store the anonymized data in the second tier;
associate a first user with the first tier based on access rights of the first user; and
associate a second user with the second tier based on access rights of the second user,
wherein the first user exchanges data with the first tier and the second user exchanges data with the second tier;
determine that a set of data to identify a user is not anonymized to a level of confidence to prevent discovery, use the set of data as a biometric to provide access to the user.

2. The apparatus of claim 1, wherein the processor is further to assign a third user associated with the second tier to a third tier and wherein an anonymization scheme with a different and greater anonymization confidence level is used in the second tier than in the third tier, wherein the second tier is on a public cloud and the third tier is on a hybrid cloud.

3. The apparatus of claim 1, wherein the processor is further to merge the first tier and the second tier such that the users associated with the first tier and the second tier are associated with the merged tier.

4. The apparatus of claim 1, wherein the processor is further to:
anonymize at least a portion of the data using a second anonymization scheme with a second anonymization confidence level less than the first anonymization confidence level to obfuscate data fields and names of data fields;
store the anonymized data using the second anonymization scheme in a third tier on a hybrid cloud in the storage, and wherein the second tier is on a public cloud; and
associate a third user with the third tier based on access rights of the third user, wherein the third user exchanges data with the third tier.

5. The apparatus of claim 1, wherein the processor is further to update the first anonymization scheme based on a comparison of the usefulness of the anonymized data with the first scheme compared to the confidence level associated with the first anonymization scheme.

6. The apparatus of claim 1, wherein the processor is further to determine the confidence level associated with the first anonymization scheme based on at least one of: a statistical analysis of the anonymization scheme and an attempt by the processor to reverse the anonymization scheme.

7. The apparatus of claim 4, wherein the first anonymization scheme compared to the second anonymization scheme includes at least one of: a greater number of anonymized fields, anonymization of fields more highly correlated to an entity, and an anonymization method that is statistically more difficult to reverse.

8. The apparatus of claim 1, wherein the processor is further to update the anonymization scheme if a number of records with the same data in a field stored with the same anonymization scheme is above a threshold such that the first anonymization confidence level is below another threshold.

9. A method, comprising:
determining a first and a greater second statistical anonymization level of data;
anonymizing the data with the first statistical anonymization level;
storing the data with the first statistical anonymization level in a first storage tier on a private cloud;
anonymizing the data with the second statistical anonymization level to obfuscate data fields and names of data fields;
storing the data with the second statistical anonymization level in a second storage tier on one of a hybrid cloud and a public cloud;
associating a first user group with the first storage tier;
associating a second user group with the second storage tier;
determining that a set of data to identify a user is not anonymized to a level of confidence to prevent discovery; and
using the set of data as a biometric to provide access to the user.

10. The method of claim 9, wherein anonymizing the data with the first statistical level comprises:
determining an anonymization scheme based on a comparison of the usefulness of the anonymized data to the effectiveness of the anonymization level; and
anonymizing the data according to the determined scheme.

11. The method of claim 9, further comprising:
determining a third statistical anonymization level of data with greater anonymization than the second statistical anonymization level;
anonymizing the data with the third statistical anonymization level to obfuscate data fields and names of data fields;
storing the data with the third statistical anonymization level in a third storage tier on a public cloud, and wherein the second tier is on a hybrid cloud; and
reassigning a portion of the second user group associated with the second tier to be associated with the third tier.

12. The method of claim 9, further comprising:
updating the statistical anonymization level of the first tier such that it is the same as the second tier; and
merging the first tier and second tier such that the first user group associated with the first tier and the second user group associated with the second tier access the same tier with the same statistical anonymization level.

13. The method of claim 9, further comprising a user with the first user group based on at least one of: target statistical anonymization level and data use type.

14. The method of claim 10, wherein determining an anonymization scheme based on a comparison of the usefulness of the anonymized data comprises prioritizing a set of fields for anonymization based on the likely use of the data by the first user group.

15. A machine-readable non-transitory storage medium comprising instructions executable by a processor to:
determine multiple data anonymization confidence levels for a database storage system based on a comparison of the privacy level of the anonymization and the effectiveness of the data as anonymized;
maintain a multi-tier database system that includes public, hybrid, and private tiers, wherein each tier corresponds to one of the determined confidence levels of data anonymization, wherein data available from a public tier and a hybrid tier has a greater anonymization confidence level than data available in the private tier and;

determine that a set of data to identify a user is not anonymized to a level of confidence to prevent discovery;
use the set of data as a biometric to provide access to the user;
anonymize the data on public and hybrid tiers to obfuscate data fields and names of data fields; and
associate user permissions with each of the tiers.

16. The machine-readable non-transitory storage medium of claim 15, further comprising instructions to:
update the anonymization confidence level of one of the tiers; and
merge a first tier with the tier with the updated anonymization confidence level where the anonymization confidence level of the first tier and the anonymization confidence level of the updated tier is the same.

17. The machine-readable non-transitory storage medium of claim 15, wherein the hybrid tier stores data with an anonymization confidence level intermediate to the confidence levels of the anonymization of the public and private tiers.

18. The machine-readable non-transitory storage medium of claim 15, further comprising instructions to add a tier with a new anonymization confidence level.

19. The machine-readable non-transitory storage medium of claim 15, further comprising instructions to:
receive data;
anonymize the data using different anonymization schemes; and
store the anonymized data differently in the first tier than in the second tier using the different anonymization schemes and by appending nonsense data to the anonymized data, wherein the anonymized data does not appear the same where the field data is the same in multiple records.

* * * * *

UNITED STATES PATENT AND TRADEMARK OFFICE
CERTIFICATE OF CORRECTION

| | | |
|---|---|---|
| PATENT NO. | : 9,977,922 B2 | Page 1 of 1 |
| APPLICATION NO. | : 14/786512 | |
| DATED | : May 22, 2018 | |
| INVENTOR(S) | : Steven J Simske | |

It is certified that error appears in the above-identified patent and that said Letters Patent is hereby corrected as shown below:

On the Title Page

Column 2, item (56), under US patent documents, Line 2, delete "2007/0185737 8/2007 Friedlander" and insert -- 2007/0185737 8/2007 Friedlander et al. --, therefor.

Column 2, item (56), under US patent documents, Line 8, delete "2014/0201847 7/2014 Ito" and insert -- 2014/0201847 7/2014 Ito et al. --, therefor.

In the Drawings

In sheet 2 of 5, FIG. 2, reference numeral 203, Line 1, delete "Anonmyize" and insert -- Anonymize --, therefor.

Signed and Sealed this
Twenty-third Day of October, 2018

Andrei Iancu
*Director of the United States Patent and Trademark Office*